US008214466B2

(12) United States Patent
Khan et al.

(10) Patent No.: US 8,214,466 B2
(45) Date of Patent: Jul. 3, 2012

(54) VIRTUALIZATION OF SCALABLE ROLE-BASED COMMAND LINE INTERFACE VIEWS

(75) Inventors: Muhammad Afaq Khan, Santa Clara, CA (US); Catherine Ann McLachlan, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 1317 days.

(21) Appl. No.: 11/860,358

(22) Filed: Sep. 24, 2007

(65) Prior Publication Data

US 2009/0083647 A1 Mar. 26, 2009

(51) Int. Cl.
*G06F 15/177* (2006.01)
(52) U.S. Cl. .................. 709/220; 709/238; 715/741
(58) Field of Classification Search .............. 709/238, 709/220; 715/745, 747, 741
See application file for complete search history.

(56) References Cited

U.S. PATENT DOCUMENTS

| 2004/0117452 A1* | 6/2004 | Lee et al. ............... 709/208 |
| 2005/0165834 A1* | 7/2005 | Nadeau et al. ........... 707/103 R |
| 2007/0064603 A1* | 3/2007 | Chen et al. ............... 370/230 |

OTHER PUBLICATIONS

Juniper Networks, Inc., "JUNOS™ Internet Software for J-series™, M-series™, and T-series™ Routing Platforms CLI User Guide Release 7.6" (Mar. 27, 2006) [retrieved from http://www.writersplus.com/Samples/JUNOS76_CLI.pdf].*
Lee, B.J.; Choi, T.; Jeong, T., "X-CLI: CLI-based Management Architecture Using XML", IFIP/IEEE Eight International Symposium on Integrated Network Management, (Mar. 24-28, 2003), pp. 477-480 [retrieved from http://ieeexplore.ieee.org/stamp/stamp.jsp?tp=&arnumber=1194203&isnumber=26863].*
Lupu, E.C.; Sloman, M., "Towards a Role-Based Framework for Distributed Systems Management", Journal of Network and Systems Management, (Mar. 1, 1997) [retrieved from http://www.springerlink.com/content/xt4917480710w142/].*
Deca, R.; Cherkaoui, O.; Puche, D., "A Validation Solution for Network Configuration", Proceedings of the 2$^{nd}$ Annual Conference on Communicaiton Networks and Services Research, (May 19-21, 2004), pp. 273-275 [retrieved from http://ieeexplore.ieee.org/stamp/stamp.jsp?tp=&arnumber=1344738&isnumber=29617].*
Cisco Systems, Inc., "Cisco IOS Software Release 12.3T Powers Cisco Integrated Services Routers" (Sep. 2004) [retrieved from http://www.cisco.com/en/US/prod/collateral/iosswrel/ps8802/ps6947/ps5207/ps5980/prod_presentation0900aecd80177aba.pdf].*
Cisco Systems, Inc. Role-Based CLI Access. 2007. http://www.cisco.com/en/US/products/sw/iosswrel/ps5207/products_white_paper09186a00801ee18d.shtml.
Logicalis Intergration Solutions. 1001 Things to Do With a Cisco Router 'Or ar least a few things'. May 31, 2004. http://www.lmn.net.uk/events/19may2004/glyn-jones.pdf.
Virtual Routing and Forwarding (VRF). http://en.wikipedia.org/wiki/VRF. Last accessed Oct. 2, 2007.

* cited by examiner

*Primary Examiner* — H. S. Sough
*Assistant Examiner* — Brian Wathen
(74) *Attorney, Agent, or Firm* — Schwegman, Lundberg & Woessner, P.A.

(57) ABSTRACT

Providing for virtualization of a role-based command line interface (CLI) view that enables highly scalable association of such a view with an inter-networking operating system (IOS) device is disclosed herein. By way of example, an IOS correlation component can define VPN routing/forwarding tables (VRFs) to reference a virtual role-based CLI view. Whereas typically an instance of the CLI view must be re-created in memory for each VRF, the subject specification provides for referencing a single CLI view that is global to an IOS platform, greatly increasing scalability of the IOS platform. According to further aspects, transferable CLI views are provided that can be saved in a portable file format and distributed amongst various network devices. The subject disclosure, therefore, provides for greatly increased efficiency and scalability with respect to configuration and implementation of IOS CLI views.

20 Claims, 11 Drawing Sheets

VIRTUALIZATION OF SCALABLE ROLE-BASED COMMAND LINE INTERFACE VIEWS

BACKGROUND

Network communication and inter-device routing can be a complex system architecture requiring detailed infrastructure maps to correctly route packets of data from a sending device to a target device. In addition, a desire to enable provider-independent communication by linking infrastructures of various network service providers can further complicate matters. For instance, services and communication technologies provided by one network operator may be unsupported by an infrastructure of another operator. Still, a minimum amount of data must be carried and properly routed by all inter-connected networks for provider-independent communication to be achieved.

One recent mechanism to enable provider-independent networking has been the virtual forwarding and routing (VRF) table. A VRF can provide for multiple routing tables, each able to direct particular network traffic in a predetermined manner, to exist on a routing device simultaneously. As a result, various operators can have their traffic handled in a manner required by their service agreements. As a result, a single device can accommodate the needs of various providers simultaneously, so as to facilitate a highly diverse yet well coordinated networking architecture.

In addition to the VRF, role-based command line interface (CLI) access features were developed for routing inter-networking operating systems (IOSs) to enable a network administrator to define command views and to allow selective or partial user access to IOS control functionality. A role-based CLI view can provide access to a subset of IOS commands; typically the subset is tailored by a network admin to include commands required to carry out a particular IOS function (e.g., routing, security, and so on). The CLI view became an easy way to provide partial access to an IOS platform so that employees can perform particular jobs.

Although CLI views had become a useful mechanism for providing selective access to an IOS, time required to configure views for large numbers of user accounts became restrictive. Large enterprises, for instance, can have thousands of employees involved in network management. In addition, network device and/or service providers typically must provide access to an IOS for their customers. However, those entities with many customers also must develop the CLI views, or provide a means for the customers to do so themselves. As a result, developing efficient use and implementation of IOS platforms and related interfaces became a goal of many network service related entities.

DESCRIPTION

Overview

Figure 1:
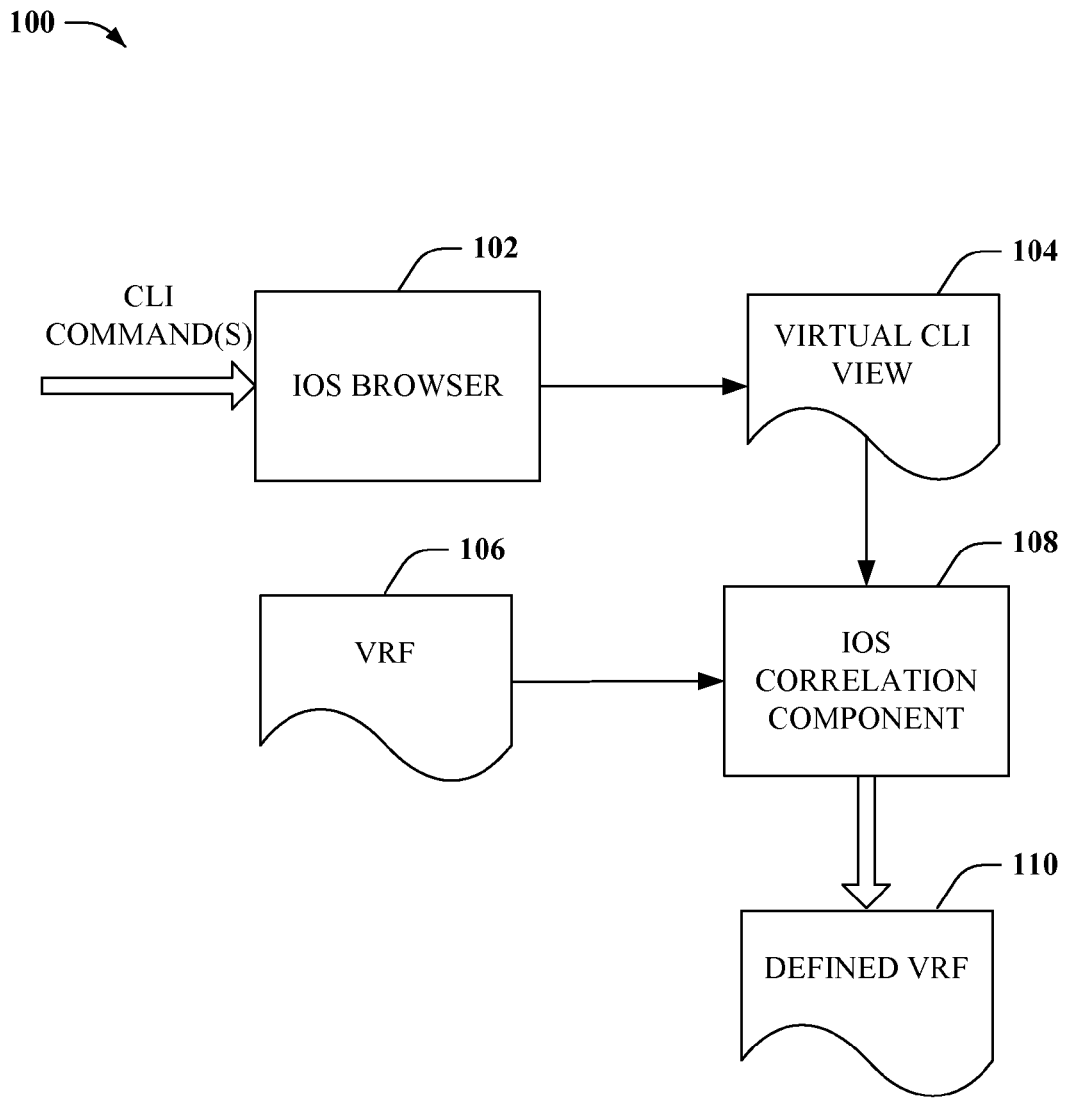
FIG. 1 illustrates a sample system that provides virtual role-based CLI views that can be defined in a network VPN routing/forwarding table (VRF).

The following presents a simplified overview in order to provide a basic understanding of some aspects of the claimed subject matter. This overview is not an extensive overview. It is not intended to identify key/critical elements or to delineate the scope of the claimed subject matter. Its sole purpose is to present some concepts in a simplified form as a prelude to the more detailed description that is presented later.

The subject matter disclosed and claimed herein, in various aspects thereof, provides for virtualization of a role-based command line interface (CLI) view that enables highly scalable association of such a view with an inter-networking operating system (IOS) device. For example, an IOS correlation component can define VPN routing/forwarding tables (VRFs) to reference the role-based CLI view. Whereas typically an instance of the CLI view must be re-created in memory for each VRF, the subject specification provides for referencing a single CLI view that is global to an IOS platform, greatly increasing scalability of network devices.

In accordance with additional aspects, an IOS platform can contain built-in views that come pre-loaded with the IOS platform. As a result, such view(s), and IOS functions and commands defined for the view(s), can be assigned to a user account rather than having to create a separate view(s) for each account. In addition, one or more views can be aggregated into a "super-view", correlated by a particular group of commands associated with a network service or function, for instance. One or more CLI views or super-views can be assigned to a user account to enable a great deal of flexibility and efficiency in generating the account and provide access to IOS commands.

In accordance with still other aspects of the claimed subject matter, a version of a virtualized CLI view can be stored within a shareable file. The file can then be exported from one platform or device to another platform or device. As a result, custom CLI views or super-views can be shared amongst various entities. According to further aspects, such custom CLI views/super-views can be stored at a network server and available for download by network devices. In such a manner, the power and flexibility provided by virtualized role-based CLI views can be greatly enhanced by way of such sharing capabilities.

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and distinguishing features of the claimed subject matter will become apparent from the following detailed description of the claimed subject matter when considered in conjunction with the drawings.

Description of Example Embodiments

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system", "interface", or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components, and can be as simple as a command line or a more complex Integrated Development Environment (IDE).

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

A role-based command line interface (CLI) access feature enables a network administrator to define command views, to allow selective or partial access to inter-networking operating system (IOS) (e.g., a system configured to provide a platform for network related applications to operate in conjunction with a network routing and/or switching device, or the like) configuration and execution commands, and the like. A role-based CLI view can include a set of operational commands and/or configuration utilities that provide access to the configuration and execution commands and related network functionality. A network administrator can selectively restrict user access to portions of an IOS CLI by associating only a subset of available CLI commands with a view assigned to a user.

One shortcoming identified with respect to conventional IOS CLI views is that each view has to be created individually by a network administrator, and a user has to manually authenticate into the view. In addition, a need for compartmentalization has arisen alongside developing network technologies that have enabled more and more converged service platforms to be integrated into a routing device and associated IOS CLI. For instance, many VPN routing and forwarding tables (VRFs), which enable multiple network routing tables to co-exist within a single router operating system (e.g., assigned to one or more network operators to direct operator traffic in accordance with the rules of each operator), may exist on a routing device simultaneously. Typically, each view must be manually configured to each VRF; however, when scores or hundreds of VRFs are co-existent on the routing device simultaneously, manual configuration of each of many views to one or many VRFs can be a very time consuming task. Moreover, each association with a VRF and/or user or group of users typically requires an additional copy of a view to be stored in memory. Such replication can greatly diminish long-term network scalability of such devices, however.

To address the foregoing problems, the subject specification virtualizes role-based CLI views to increase their flexibility and portability. A view is defined only once and then associated within a definition of a VRF, instead of in a CLI view "commands" context, for instance. As a result, if a user authenticates on a network interface having a VRF configured to such interface, an IOS can use the VRF name to identify an associated view and apply the view to the user's session. In this manner, a CLI view can be defined independent of a VRF, and later correlated to one or more VRFs by a user. The subject specification greatly increases scalability of such mechanisms by removing a need to replicate a CLI view for each VRF it is associated with; a CLI view can be associated instead with any or all suitable existing and future VRFs. Virtualized IOS CLI command views can be extremely valuable for large enterprises and to network service providers (e.g., utilizing MPLS or Internet Protocol (IP) based virtualization, such as multi protocol label switching (MPLS) virtual private networks (VPNs), vrf-lite, or vNET, or like existing or future technologies) that facilitate network communication for many groups of users and individual customers.

Referring now to FIG. 1, a system 100 is depicted that provides for virtualized IOS CLI command views in accordance with aspects of the subject disclosure. Such virtualized command view can be defined independent of a single user or group of users, and independent of a VRF associated with such view. As a result, the virtualized command view can be referenced by multiple VRFs and authenticated to many users without need of replicating the command view in memory.

Consequently, use of virtualized command views can greatly enhance scalability of routing devices and associated IOSs over conventional role-based command views by minimizing memory resources needed to support such views.

In accordance with one or more aspects, system 100 can include an IOS browser 102 that can integrate an IOS platform command into a virtualized IOS command view 104. The IOS platform command can be a part of an IOS platform (e.g., any suitable operating system loaded onto a network routing device) and can provide access to various functionality of the IOS platform (e.g., including configuration, execution, and like functionality). IOS browser 102 can be any suitable interface (e.g., human machine interface application) between a user control device (e.g., computer, PDA, laptop, router control and/or input mechanism, etc.) and a router IOS. IOS browser 102 can, for instance, allow a user (e.g., a network administrator) to access the IOS platform, define an IOS command view 104, and associate a subset of IOS platform commands to the IOS command view 104. In addition, such IOS command view can be independent of a particular segment of the IOS platform, such as a routing table, VRF (106), or the like. For instance, the IOS command view can be defined global to the IOS platform and correlated to various suitable IOS platform entities (e.g., routing table, VRF (106), user or group of users, or the like).

System 100 can also include an IOS correlation component 108 that can associate virtual CLI view 104 with a definition of a VRF 106. Such association can result in a defined VRF 110. For instance, virtual CLI view 104 can be global to an IOS platform (discussed above) and therefore available for association with a specified IOS platform entity (e.g., VRF, routing table, and the like) by a user authenticated to the virtual CLI view 104. More specifically, such an authenticated user can utilize the IOS correlation component 108 to authenticate virtual CLI view 104 with VRF 106, resulting in defined VRF 110. An authenticated user can then view, access and/or configure the defined VRF 110 by way of an IOS platform command(s) correlated with the virtual CLI view 104 (e.g., by IOS browser 102).

In accordance with additional aspects, defined VRF 110 can be associated with multiple virtual CLI views (104) that can provide varying levels of access to an IOS platform entity (e.g., such as a VRF (106). For instance, each CLI view (104) can be associated with a different subset of IOS platform commands, thereby providing access to different IOS platform functionality by way of the CLI views (104). As a particular example to provide context for system 100, but not to be construed as limiting the scope of the subject disclosure to the particular embodiments articulated, 10 different virtual CLI views (104) can be defined, each having a different subset of IOS platform commands integrated therewith (e.g., by IOS browser 102). In addition, each of these 10 different virtual CLI views (104) can be authenticated to one or more users or groups of users (see FIG. 2, infra, for an example depiction of user session authentication). The authenticated users can then include a reference to their respective virtual CLI views (104) within the definition of VRF 106, resulting in a defined VRF (110) that contains all such references. As a result, each of the 10 users can have access to varying aspects of VRF 106 by way of the subset of IOS platform commands incorporated into a particular virtual CLI view (104) authenticated to such users and defined within the defined VRF 110.

As described above, system 100 provides for defining a CLI view 104 independent of an IOS platform entity (e.g., VRF). In such a manner the CLI view 104 need not be replicated in memory for each association with an additional IOS platform entity. Instead, a reference to the CLI view 104 can be defined within one or more IOS entities (e.g., VRF 106, resulting in defined VRF 110). Consequently, device memory requirements associated with replicating many identical CLI views for various IOS entities can be mitigated or avoided, substantially increasing router scalability.

The following example is provided in order to distinguish some aspects of system 100 from conventional IOS platform mechanisms. An example conventional, non-scalable, VRF and CLI view association could be as follows:

```
ip vrf v1
   rd 1:100
   route-target export 1:100
   route-target import 1:100
!
7206-2 (config) #parser view myview
7206-2 (config-view) #comm
7206-2 (config-view) #commands ex
7206-2 (config-view) # commands ex in
7206-2 (config-view) #commands exec include sho
7206-2 (config-view #commands exec include show ip route vrf v1
Translating "vrf"
7206-2 (config-view) #
```

After adding a few more commands for illustration purposes "myview" can appear as follows:

```
7206-2# sh runn | b parser
parser view myview
   secret 5 $1$twsP$FiiRcnP6Yqxa7sXMA287x.
   commands exec include show crypto
   commands exec include show ip route vrf
   commands exec include show ip route
   commands exec include show ip
   commands exec include show all
```

This conventional example indicates that, although VRF awareness can be added so that the system will appear as "show ip route vrfv1", the association between VRF and CLI view will not be scalable. In contrast, the following example provides for a scalable association in accordance with aspects of the subject specification:

```
7206-2 (config) # ip vrf v1
7206-2 (config-vrf) #view myview [Future CLI]
7206-2#sh run | b v1
ip vrf v1
   rd 1:100
   route-target export 1:100
   route-target import 1:100
!
7206-2# sh runn | b parser
parser view myview
   secret 5 $1$twsP$FiiRcnP6Yqxa7sXMA287x.
   commands exec include show crypto isakmp sa
   commands exec include show ip route
   commands exec include show ip
   commands exec include all show
```

In this case, the line 'view myview' associates 'myview' to a VRF within the definition of the VRF. As depicted by the example, a single iteration of 'myview' can be created without reference to (and without limiting the 'myview' to) a particular VRF. 'Myview' can then be correlated to one or more VRFs (e.g., by including a reference to 'myview' within the definition of a VRF) and the commands associated with 'myview' (e.g., show crypto, show ip route vrf, show ip route, and so on) can be used in conjunction with such one or more VRFs. This approach can provide for true virtualization and compartmentalization of role-based CLI access (e.g., per-VRF, per-VLAN, etc.). As a result, an extremely scalable mechanism for defining and associating a virtualized view, which can reduce view configuration time and also free up router NVRAM space, is also provided. These benefits can be particularly important for service providers or large enterprises utilizing, for instance, MPLS or IP based virtualization where thousands of VRFs can be defined for each of many routing devices (e.g., an MPLS VPN, vrf-lite, or future implementations such as vNET and the like).

Figure 2:
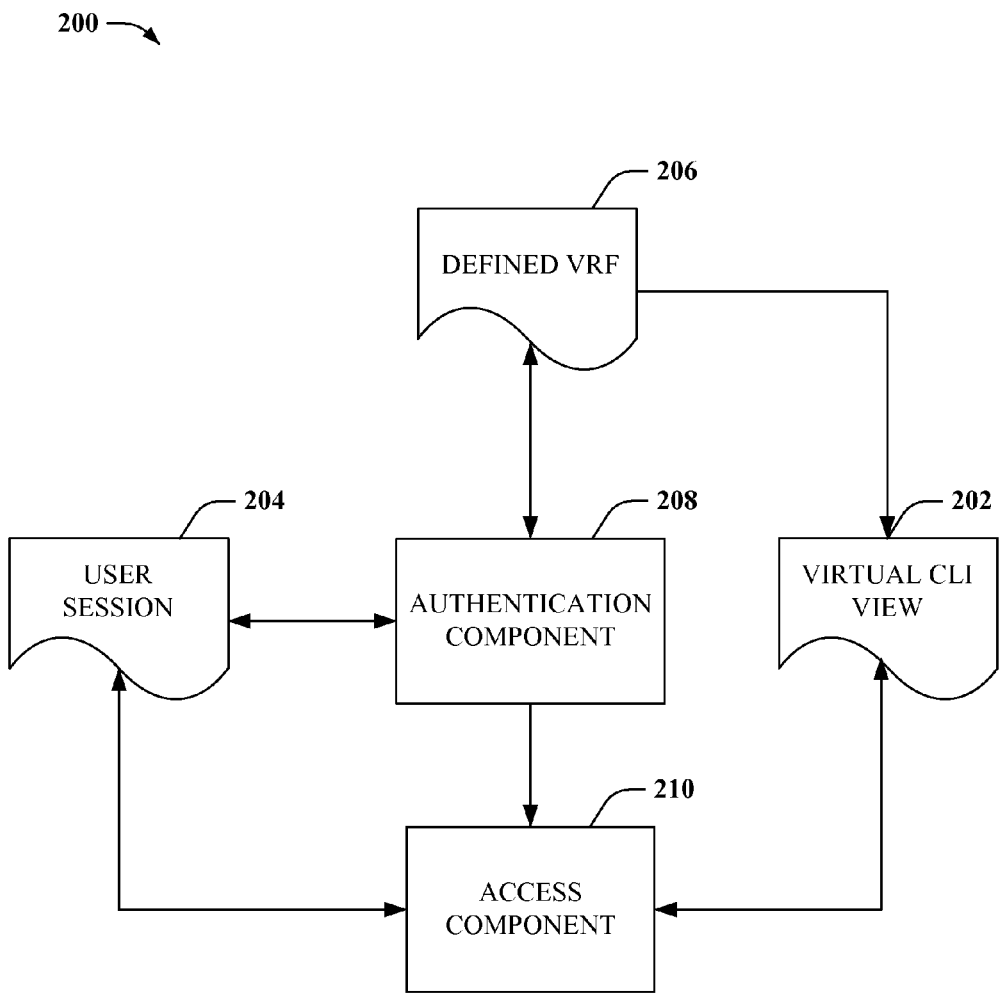
FIG. 2 depicts an example system that can associate a virtual CLI view with a user session and/or VRF in accordance with one or more aspects.

Referring now to FIG. 2, a system 200 is depicted that can associate a virtual CLI view 202 with a user session 204 and/or VRF (206) in accordance with one or more aspects. A defined VRF 206 can be any suitable VRF for an IOS platform (e.g., a network operating system utilized in conjunction with a routing device) that contains a reference to a virtual CLI view 202 within a definition of the VRF (as discussed supra, at FIG. 1). Such reference can enable access and configuration of defined VRF 206 by way of an IOS platform command associated with the virtual CLI view 202, for instance. The virtual CLI view 202 can also contain a username and/or password, or like security mechanism, with which to authenticate a user session 204 to the virtual CLI view 202 and defined VRF 206.

In accordance with additional aspects of the subject disclosure, system 200 can include an authentication component 208 that can reference a name of defined VRF 206 to identify a virtualized IOS command view (e.g., virtual CLI view 202) defined therein. In addition, the virtualized IOS command view (202) can employ a security mechanism (e.g., username, password, or the like, not shown) to provide selective access by a user session 204 to the command view (202). Authentication component 208 can therefore, in accordance with the security mechanism, determine whether user session 204 should be allowed access to virtual CLI view 202. If access is appropriate, authentication component can flag access component 210 to connect user session 204 and virtual CLI view 202.

In accordance with particular aspects of system 200, access component 210 can apply a virtualized IOS command view (202) to user session 204 that is authorized to access the virtualized IOS command view (202). Subsequently, user session 204 can make use of IOS platform commands associated with the command view (202) to interact with the VRF. For instance, configuration commands and/or router 'exec' commands associated with virtual CLI view 202 can be accessed and implemented with respect to VRF 206. Furthermore, access component can store a flag indicating that user session 204 is authorized to access a particular CLI view (202) on defined VRF 206 for future reference. When user session 204 is later initiated, access component 210 can immediately apply the particular CLI view (202) to user session 204 (e.g., upon entering security mechanism credentials). As depicted, system 200 provides for secure interface between a user session 204 and virtual CLI view 202 by way of a VRF (206) having a defined reference to virtual CLI view 202.

Figure 3:
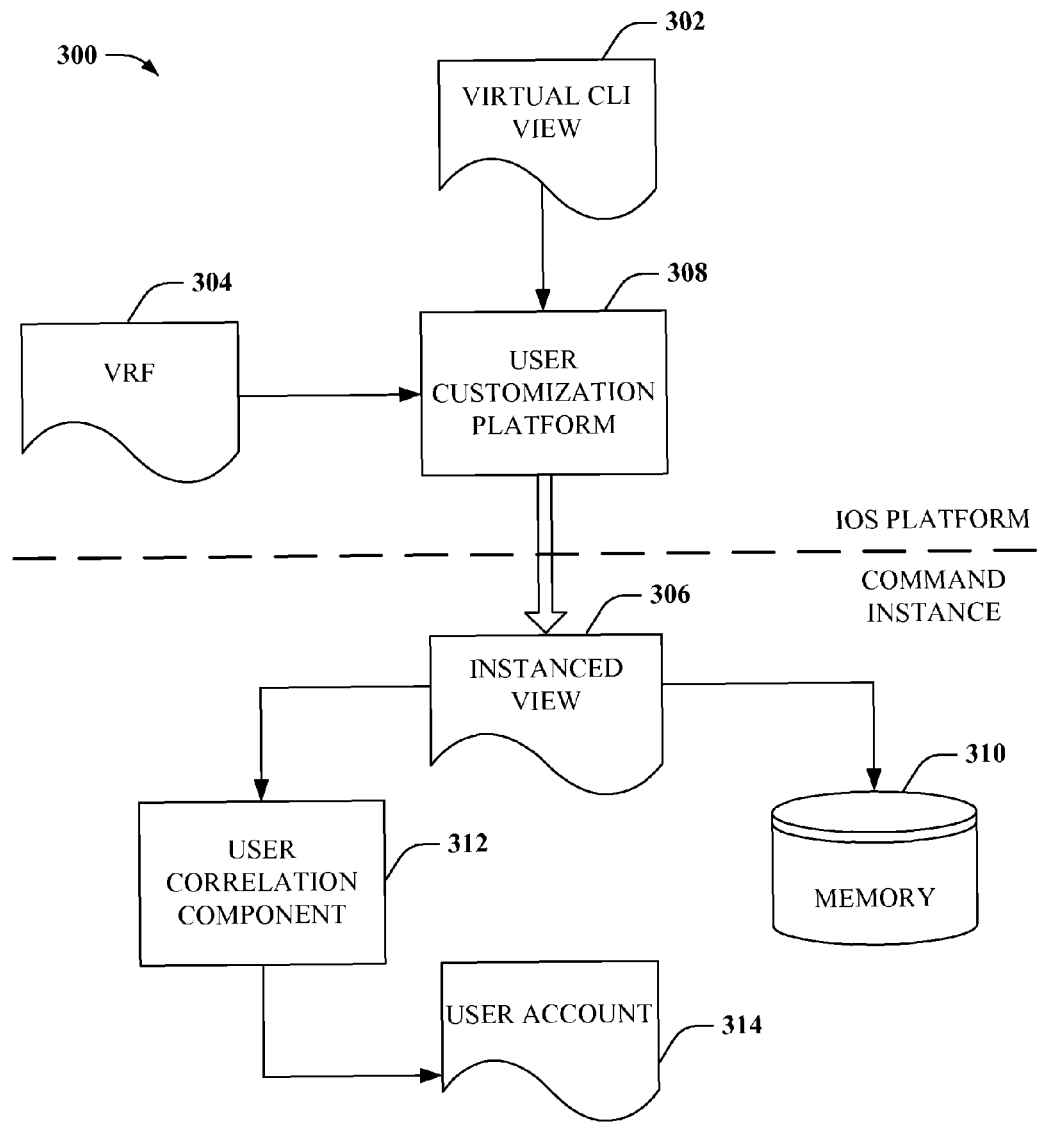
FIG. 3 depicts an example system that can generate an instanced CLI view local to a device or user account in accordance with additional aspects.

FIG. 3 depicts an example system 300 that can generate an instanced CLI view local to a device or user account in accordance with additional aspects. Consequently, system 300 can provide flexibility with respect to a virtual CLI view 302 defined global to an IOS platform rather than local to a particular IOS entity (e.g., VRF 304, etc.) For example, system 300 can create an instance of a virtual CLI view 302 upon association of such view (302) with a VRF 304. The instance can be modified independent of parameters and configurations established for virtual CLI view 302, enabling customization of 'template' CLI views (302) as needed for particular users and/or IOS entities without modifying the 'template' (302). Consequently, system 300 can provide network scalability by way of a virtual CLI view 302 that can be referenced by various IOS entities and flexibility by way of an adjustable instance(s) (306) thereof.

According to particular aspects, system 300 can include a user customization platform 308 that can generate a CLI view instance 306 on an IOS platform. The CLI view instance can enable modification of a virtual IOS command view (302) with respect to an IOS entity (e.g., VRF 304). For example, CLI view instance 306 can be created within a portion of memory 310 allocated to a particular IOS entity (e.g., VRF 304). Memory 310 can load virtual CLI view 302 as a default template, save modifications made to the virtual CLI view 302 in the portion of memory 310 allocated to the CLI instance 306, and keep those modifications private to VRF 304. As a result, a custom version of virtual CLI view 302 can be created (e.g., a network admin can remove some commands associated with such view (302) or add new commands, and so on) that enables localized modifications to be made without requiring a new CLI view (302) to be generated. In such a manner, system 300 can provide flexibility to network administrators and users and further decrease configuration and setup time associated with IOS devices.

According to additional aspects, system 300 can include a user correlation component 312 that enables a user to generate a CLI view instance (306) local to a user account 314. Such CLI view instance can be utilized to modify a virtualized IOS command view and save a modified command view private to user account 314. The user correlation component 312 can allocate a portion of memory 310 to such user account 314, for example. A copy of virtual CLI view 302 can be loaded within the allocated portion of memory 310 (e.g., in conjunction with user customization platform 308). In addition, changes to virtual CLI view 302 can be made and stored private to user account 314, so that virtual CLI view 302 is not affected by such changes. In such a manner a user can modify a CLI view (302) in accordance with particular user needs without having to create a new CLI view dedicated to such needs.

It should be appreciated that further aspects of system 300 provide for localizing an instance view 306 with both VRF 304 and user account 314. For example, a portion of memory 310 can be allocated to a particular VRF 304 (or, e.g., group of VRFs, not depicted) as well as a particular user account 314 (or, e.g., group of user accounts, not depicted). A virtual CLI view 302 can be loaded onto memory 310 and modifications to such view (302) can be saved as a CLI view instance 306 in the allocated portion. Such CLI view instance 306 could be applicable only to the specified VRF(s) 304 and by the specified user account(s) 314. In such a manner modifications to a virtual CLI view 302 that are appropriate to a particular VRF (304) and/or user account (314) can be made without modifying associations between other IOS entities (e.g., VRFs, routing devices, user accounts, and so on) and virtual CLI view 302. It is to be further appreciated that CLI view instance 306 can be particular to other IOS platform entities, such as a routing device, other than those particularly articulated herein and/or described in the figures. Association of a CLI view instance 306 to additional IOS entities, known in the art or made known to one of skill in the art by way of the context provided by the subject disclosure, is incorporated herein.

Figure 4:
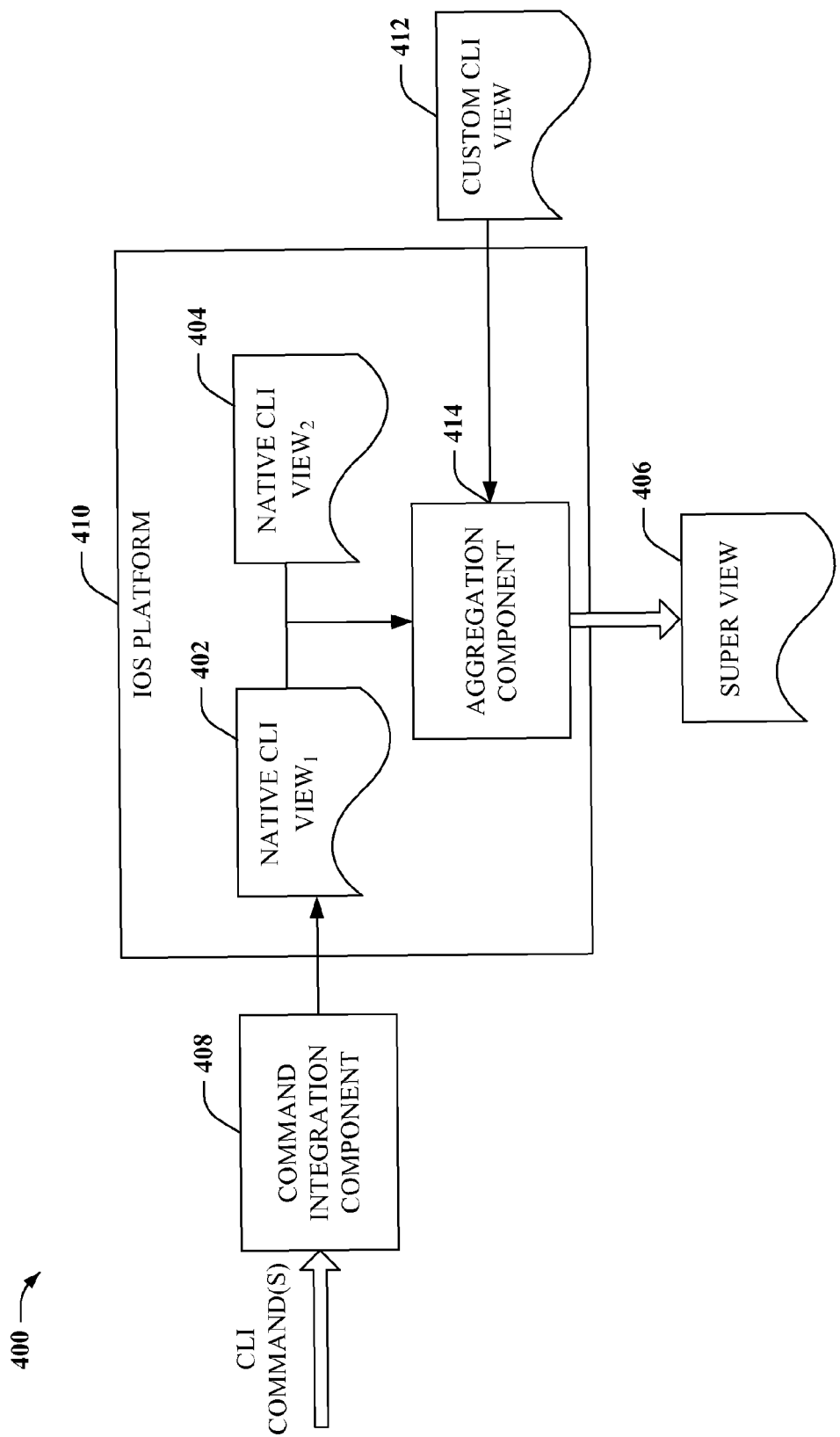
FIG. 4 illustrates a sample system that can aggregate two or more virtual role-based CLI views into a super-view.

FIG. 4 illustrates a sample system 400 that can aggregate two or more virtual role-based CLI views (402, 404) into a super-view (406). Therefore, super-view 406 can be a compilation of two or more CLI views (402, 404) and/or commands associated with such views. In addition, super-view 406 can be associated with a particular network service or function, such as security, routing, wireless transport, and so on (additional features can include, e.g., wide area network (WAN) optimization, command management, administrative control, debugging, configuration, show command, video transfer, voice transfer, or data transfer features, or combinations thereof or of like features). In such case super-view 406 could be comprised of native CLI views (402, 404) related to a particular service or function and incorporate all (or, e.g., a subset) of the commands or functionalities associated with such a service or function. In addition to the foregoing, super-view 406 can be assigned to one or more user accounts (not depicted) to provide access to the functionality within super-view 406 to such user accounts. Consequently, system 400 can compile aggregated directories (e.g., super-view 406) of commands related to a particular service(s), function(s), or the like, and associate a user account with all or a portion of all of the commands for one or more such services, etc. Thus, system 400 can greatly reduce time required to configure access to a large set of IOS platform functionality for one or more user accounts.

According to particular aspects of the subject disclosure, system 400 can include a command integration component 408 that defines a native CLI view (402, 404) for an IOS platform. Such a native CLI view (402, 404) can be incorporated as part of an IOS platform 410. For instance, such a view can be a template that is pre-defined with one or more CLI commands and that can be applied to various ISO entities (e.g., VRF, routing table, routing device, and so on), modified CLI views (e.g., see FIG. 3, supra), and/or user accounts, or combinations thereof or of the like. Specifically, command integration component 408 can receive one or more IOS CLI commands and incorporate such commands into a native CLI view 402, 404. Furthermore, native CLI views 402, 404 can be defined for a particular subset of IOS CLI commands and various IOS entities (e.g., VRFs) can reference such views (402, 404). As described, native CLI views 402, 404 enable a system administrator to quickly associate a pre-defined set of commands with an IOS entity and/or user without having to establish a custom CLI view (412), which can reduce configuration time for IOS devices.

According to further aspects, an aggregation component 414 can define super-view 406 as being associated with at least a first native command view (e.g., native CLI view$_1$ 402), a second native command view (e.g., native CLI view$_2$ 404), and/or a custom CLI view 412. Custom CLI view 412 can be a virtual CLI command view associated with one or more IOS platform commands as defined herein. In addition, aggregation component 414 can incorporate at least one command associated with native CLI view$_1$ 402, native CLI view$_2$ 404 or custom CLI view 412 into super-view 406. It should also be appreciated that any suitable number of native or custom CLI views (402, 404, 412) and associated commands can be incorporated into super-view 406 in accordance with one or more aspects disclosed herein.

In addition to the foregoing, at least one of the native command view, the super-view or the second native command view can be a pre-defined (e.g., built-in) command view associated with an IOS platform (410) service or feature. Specifically, a native CLI view 402, 404 or super-view (412) can be associated with a particular subset of IOS platform (410) CLI commands related to a service or feature of IOS platform 410. For example, a security native command view (402, 404) can be pre-defined with commands tailored specifically for security services (e.g., user authentication, device authentication, and so on). Likewise, a video transport native command view (402, 404) can be pre-associated with IOS platform 410 commands related to streaming video routing technologies, and so on.

The following is provided as a more specific example of aspects of system 400 and to provide context for the subject disclosure, but not to limit such disclosure to the particular embodiments articulated herein. For instance, a routing.igp super-view can include interior gateway protocols (IGP), or a management super-view can include ios_smp views and related views that can be attributed to management functions. Furthermore, additional built-in super-views (406) and views (402, 404) can be provided along with an addition of a new feature or technology, for instance. As an additional example, such built-in views/super-views 402, 404, 412 can be associated with feature 'exec' level commands, feature 'config' level commands and like nested level commands, or feature 'show' and 'debug' commands, or combinations of thereof or of like commands. As an additional example, a 'show parser' command can be integrated into an admin view to identify commands/views included within a built-in view or built-in super-view, respectively.

In addition to the foregoing, if a system administrator wished to create a user as "NetOp", the admin can simply assign a NetOp user id to a relevant network oriented super-view 406 e.g., aggregating routing.igp, routing.egp, or show_all functions, or the like. Alternatively, or in addition, if the admin wished to create a user as "SecurityOp", the admin can assign a SecurityOp user id to a relevant security oriented super-view 406 e.g., aggregating security and/or show_all functions. Furthermore, the admin can create a very complex custom CLI view 412 with full confidence that relevant commands will not be missed. For instance, a user can be part of a custom super-view 406 such as "ips_fw_fpm_snmp_admins", and therefore the admin can add individual built-in views (402, 404) to this super-view 406, such as ios_fw, ios_ips, ios_fpm, and ios_snmp views, for instance. All commands associated with such views will be incorporated into the super-view; the admin does not have to account for each and every individual command.

By pre-defining native CLI views 402, 404 (or, e.g., a native super-view 406) in accordance with particular functions or features, user groups and IOS entities can be managed as a function of such features. As a result, a logical relationship can exist between a name of a native CLI views or super-views (402, 404, 412) and a function of an IOS entity (e.g., VRF) or user utilizing the view or super-view. Consequently, system 400 can enable efficient association of views with large numbers of individual users and/or IOS entities while minimizing configuration and setup time associated with generating and defining such views for a new IOS platform or device.

Figure 5:
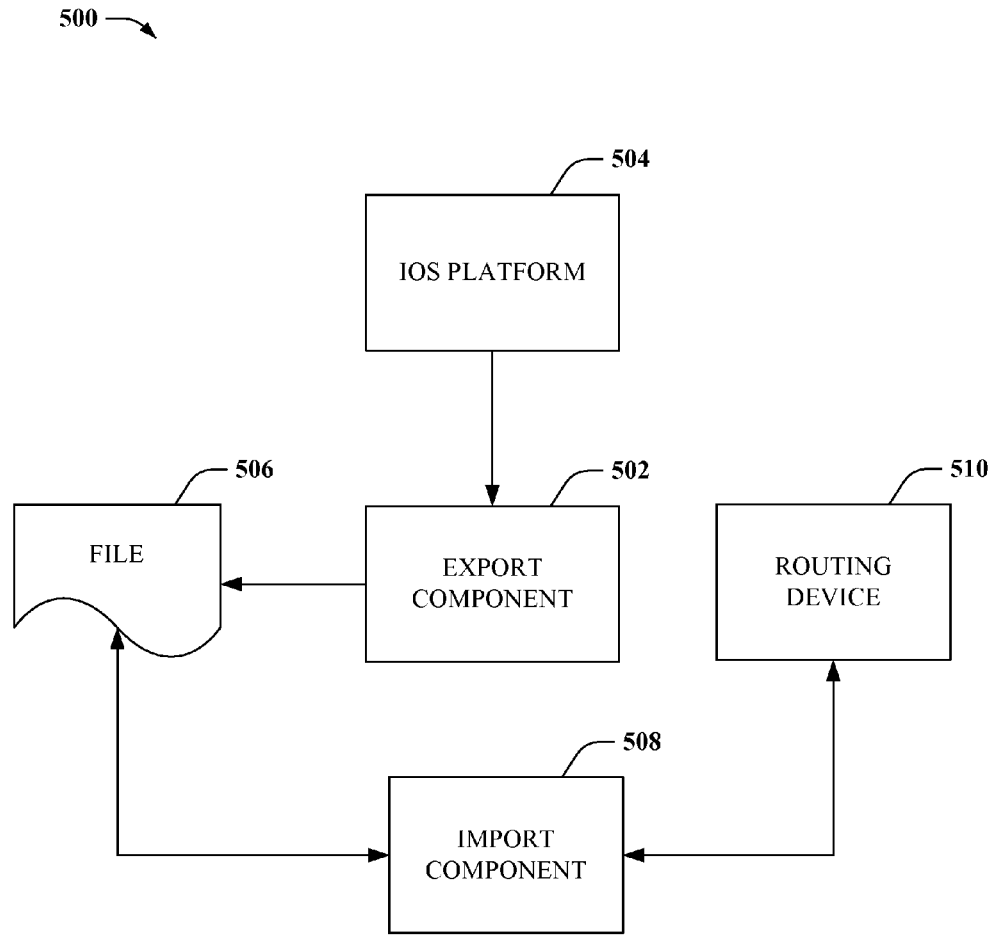
FIG. 5 depicts an example system that facilitates export and import of sharable CLI views in accord with one or more additional aspects.

FIG. 5 depicts an example system that facilitates export and import of sharable CLI views in accord with one or more additional aspects. Conventional systems that allow custom definition of CLI views do not allow such custom views to be copied, transferred, imported, etc., between devices. As a result, each routing device must have individual views configured for the device, even if many or all of the views are identical to views created for another routing device. To address this problem the subject disclosure provides for a scalable mechanism to export one or more IOS CLI views, whether built-in to an IOS platform or custom generated by a network admin, into a shareable file format (e.g., a mark-up language, such as XML, or any suitable sharable file language). As a result, a view, super-view, or groups of both can be generated one time (whether as pre-defined or not) and then copied amongst suitable network devices. Substantial mitigation of redundant work can be greatly reduced by aspects of system 500, as described below.

In accordance with particular aspects, system 500 can include an export generation component 502 that can interface with an IOS platform 504 and export a virtualized IOS command view in the form of a digital file 506 for integration into one or more IOS platform routers. IOS platform 504 can be any suitable operating system for components of a communication network. Typically, IOS platform 504 can provide support for various network application, device, troubleshooting, and configuration commands, and so on, associated with such an operating system. Additionally, IOS platform 504 can provide support for aggregation of one or more such commands into CLI views, as described herein. Such views can come pre-defined within IOS platform 504 or generated by a system admin (e.g., by way of an IOS browser and/or IOS correlation component, depicted supra at FIG. 1).

IOS platform 504 can interface with export generation component 502 to generate file 506. For instance, export generation component 502 can translate a view, including name of the view, associated IOS platform (504) commands, associated IOS entities (e.g., VRFs, not depicted), and/or associated user accounts (not depicted) for instance, from a language utilized by IOS platform 504 to a sharable network file transfer language such as a markup language (including, e.g., hypertext transport markup language (HTML), extensible markup language (XML), or combinations thereof or of the like). Additionally, export generation component 502 can include complete IOS version/image information that can be utilized to determine whether all IOS commands included within a view (or, e.g., super-view, or the like) are supported at an input IOS. Once translated, file 506 can be saved to memory (not depicted) within IOS platform 504, export generation component 502, or various other components of system 500 or within memory external to system 500, for instance. As a result, the file 506 can be transferred to other devices, platforms, entities, etc., for incorporation therein.

In accordance with other aspects of the claimed subject matter, system 500 can include a view import component 508 that can receive a digital file 506 containing an exported version of a virtualized IOS command view and incorporate the command view into a IOS platform 504 (e.g., or a compatible IOS platform) loaded on a network routing device 510. File 506 can be received from export generation component 502, or for instance, from a memory device (e.g., hard drive, floppy disc, CD-ROM, DVD-ROM, Flash drive, and so on, not depicted) containing a digital copy of file 506. Upon receipt of the file 506, view import component 508 can reference IOS version/image information included within the file to determine whether all view commands are supported by network routing device 510. If some or any commands are not supported at an IOS associated with network routing device 510, view import component 508 can generate an error and terminate an import procedure. If all commands are supported the import procedure can proceed.

In addition to the foregoing, view import component 508 can facilitate translating file 506 from a sharable network file transfer language (e.g., HTML, XML, and so on) to an IOS language recognized by IOS platform 504 loaded on routing device 510. As described, system 500 can provide substantial benefit for configuration and application of virtualized IOS CLI views by rendering such views transportable from one device and/or IOS to another. For example, typical IOS network configuration can require generation of new and possibly redundant CLI views for each IOS device (e.g., router), each IOS entity (e.g., VRF, routing table, etc.) associated with an IOS device, and for each user account. For large networks, this can be a formidable task. However, by providing sharable virtual CLI views that can be distributed amongst devices and assigned to groups of IOS entities and user accounts, time involved in such task can be vastly reduced and/or eliminated.

Figure 6:
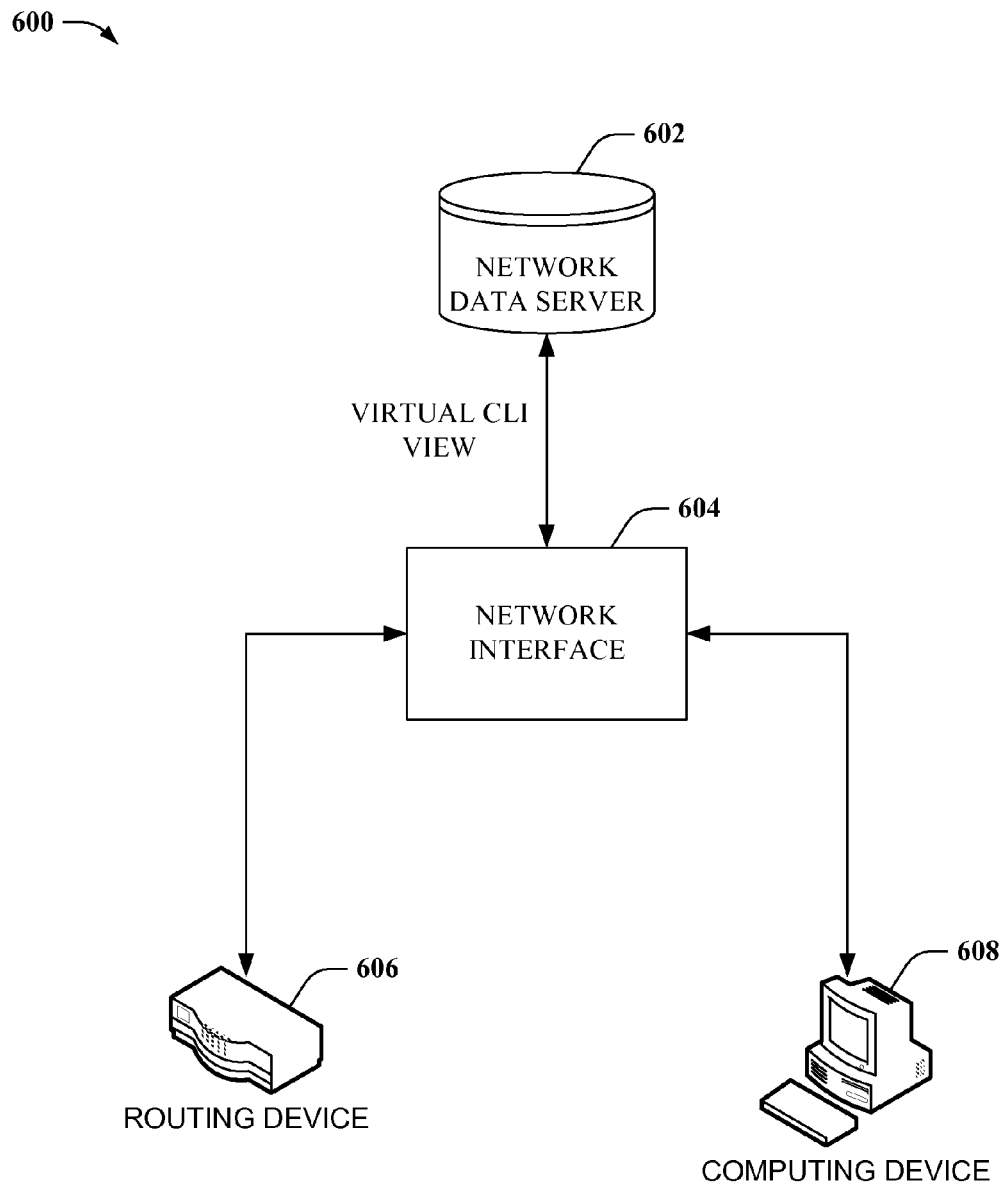
FIG. 6 illustrates an example system that provides for downloading of sharable CLI views.

FIG. 6 illustrates an example system 600 that provides for downloading of sharable CLI views in accord with additional aspects of the claimed subject matter. Conventional IOS platforms do not allow IOS CLI views to be transferred, exported, saved as removable files, or the like. In conjunction with system 500, for instance, configured CLI views can be saved as transportable files and transferred between communication devices. As a result, remote storage and mass access of such files is feasible, providing for downloadable 'built-in' CLI views.

In accordance with particular aspects of the claimed subject matter, system 600 can include a network data server 602 that provides access to an exported version of a virtualized IOS command view for download over a network. Network data server 602 can be any suitable remote storage device capable of storing digital information (e.g., a sharable form of a CLI view, such as in a HTML or XML format) and communicating by way of a network interface 604. Such network interface 604 can be a wired or wireless network, ad hoc connection, or like mechanism suitable for remote communication. In addition, network interface 604 can provide a connection between network data server 604 and one or more networked devices, including routing device 606 and computing device 608. Such devices 606, 608 can download information stored at network data server 602 by way of network interface 604. More particularly, devices 606, 608 can download a virtual CLI view file from network data server 602. As discussed above at FIG. 5, the virtual CLI view file can be transferred from device to device by way of a network interface 604 between remote devices (606, 608, 602). As described, system 600 can provide for remote access (e.g., to a website, FTP site, or the like) to pre-configured virtualized CLI views, as described herein, to reduce configuration and setup times for network devices (e.g., routing device 606, computing device 608, etc.)

The aforementioned systems have been described with respect to interaction between several components. It should be appreciated that such systems and components can include those components or sub-components specified therein, some of the specified components or sub-components, and/or additional components. For example, a system could include IOS browser 102, IOS correlation component 104, and authentication component 208, or a different combination of these and other components. Sub-components could also be implemented as components communicatively coupled to other components rather than included within parent components. Additionally, it should be noted that one or more components may be combined into a single component providing aggregate functionality. For instance, authentication component 208 can include access component 210, or vice versa, to facilitate authenticating and connecting a user session with a virtual CLI view by way of a single component. The components may also interact with one or more other components not specifically described herein but known by those of skill in the art.

Furthermore, as will be appreciated, various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, and in addition to that already described herein, can draw inferences based on a database of information and update a system as a result of such inferences. Alternatively, or in addition, the components can automate certain mechanisms or processes performed thereby to make portions of the systems and methods more adaptive as well as efficient and intelligent.

In view of the example systems described supra, methodologies that may be implemented in accordance with the disclosed subject matter will be better appreciated with reference to the flow charts of FIGS. 7-10. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, carrier, or media.

Figure 7:
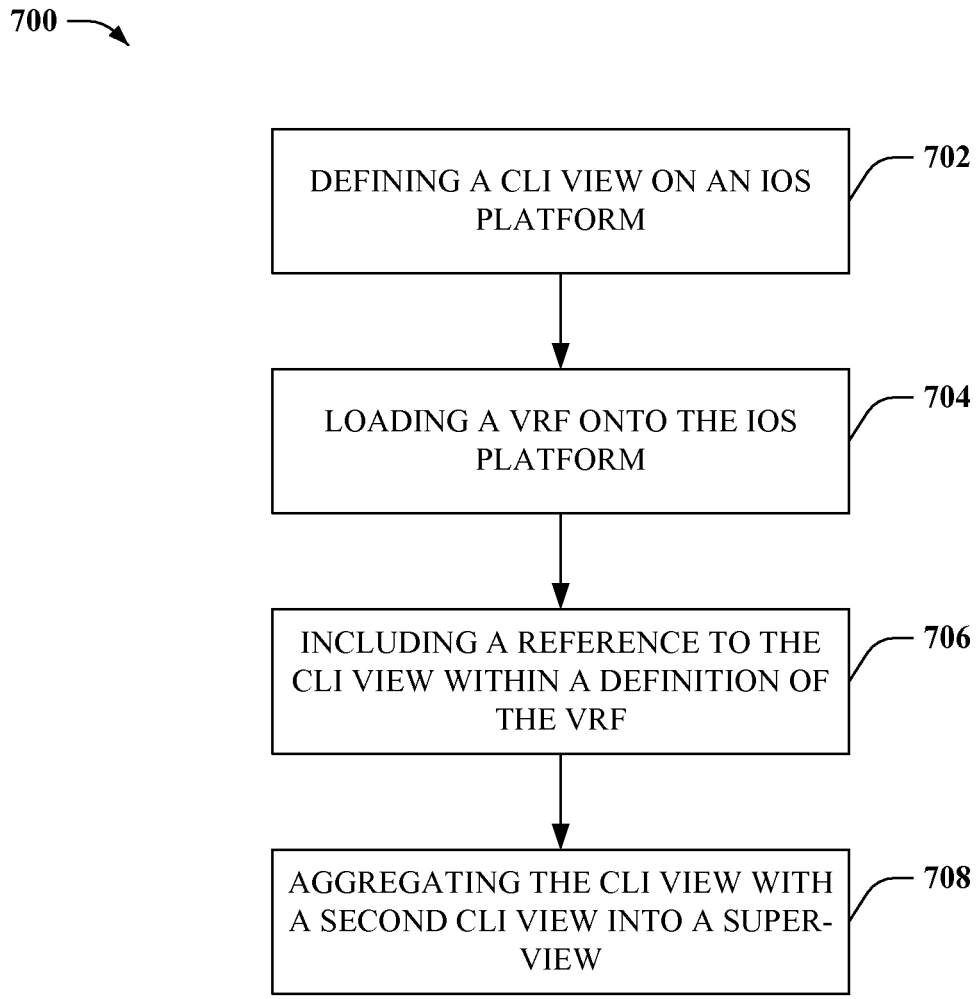
FIG. 7 depicts a sample methodology for providing virtual role-based CLI views that can be defined in a network VRF in accordance with one or more aspects.

Referring now to FIG. 7, an example sample flowchart 700 is depicted for providing virtual role-based CLI views that can be defined in a network VRF in accordance with one or more aspects. Method 700, at 702, can define a virtual CLI view on an IOS platform. For instance, the CLI view can provide a correlation between a user account or device entity (e.g., VRF, routing table, routing device, or the like), or both, and a subset of commands associated with various functions and configurations of the IOS platform. As an example, the virtual CLI view can be related to a particular IOS platform function, such as network routing, and be assigned various network routing functions as described herein. It should be appreciated that the virtual CLI view, defined on the IOS platform, is not bound to any specific user account or IOS device entity. Instead, a reference to the virtual CLI view can be provided with a plurality of device entities and/or user accounts.

At 704, method 700 can load a VRF onto the IOS platform. The VRF can allow multiple instances of one or more routing tables to co-exist on a single routing device, for instance. For example, multiple network service providers utilizing a routing device to carry traffic can have varying rules associated with data transfer for their respective networks. The VRF can enable data associated with a first network provider to be routed in a first manner, and data associated with the second network provider to be routed in a different manner, for instance. It should be appreciated that many routing tables can co-exist within a VRF, and many VRFs can co-exist on a single routing device/IOS platform.

At 706, method 700 can include a reference to the virtual CLI view within a definition of the VRF. Furthermore, any number of VRFs or user accounts, or the like, can define such a reference. As a result, multiple user accounts can authenticate to the VRF and/or the virtual CLI view and can access the commands associated with the CLI view, without an IOS platform or routing device having to replicate a CLI view for each user/view association. At 708, the virtual CLI view and at least a second virtual CLI view can be aggregated into a CLI super-view. Moreover, the CLI super-view can incorporate commands from aggregated virtual CLI views into the CLI super-view. For instance, at least one command associated with the first virtual CLI view or at least one command associated with the second virtual CLI view can be incorporated into the CLI super-view. Additionally, such commands can be correlated with an IOS platform service or features, such as security, network routing, voice traffic, management, or the like, as described herein or known in the art. As described, method 700 can greatly reduce configuration time required to establish a large number of user accounts on an IOS platform or an IOS related device, while dramatically increasing scalability of the IOS platform/device.

Figure 8:
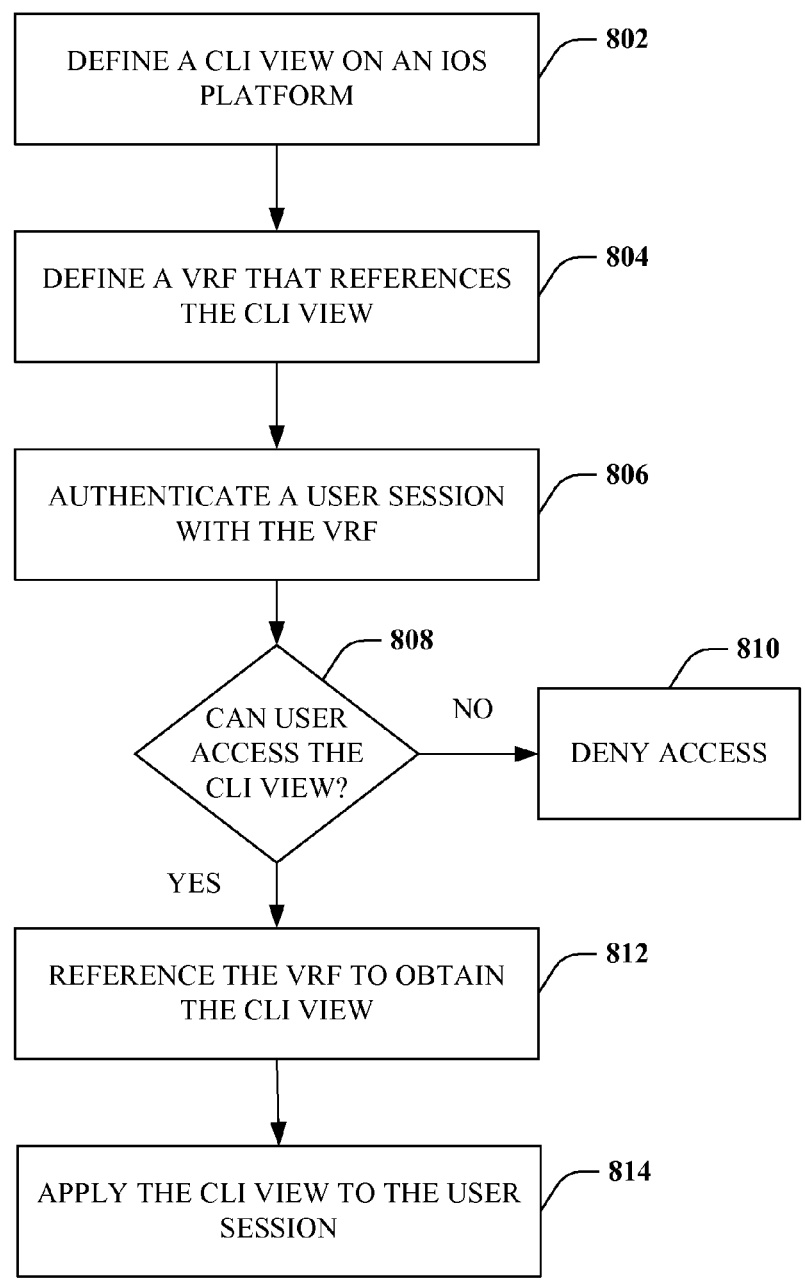
FIG. 8 depicts a sample methodology for associating a user account with a CLI view by way of reference to a VRF in accordance with additional aspects.

Referring now to FIG. 8, an example flowchart 800 is depicted for associating a user account with a CLI view by way of reference to a VRF in accordance with additional aspects. Method 800, at 802, can define a virtual CLI view on an IOS platform. The virtual CLI view, defined in this manner, can be independent of IOS entities and/or user accounts on a network, but can also be associated with multiple instances of the same. Moreover, such association does not require replication of the virtual CLI view; instead, each IOS entity or user account can simply define a reference to the CLI view and access commands configured therein. As a result, such virtual CLI command can increase scalability of a network, especially for large service providers or enterprises that have many user accounts and/or configurable network devices.

At 804, a VRF can be defined that references the virtual CLI view. Such definition can be substantially similar to that described elsewhere herein. At 806, a user session can be authenticated with the VRF. At 808, a determination can be made as to whether the user session can access the CLI view. If the user session does not have access to the CLI view, method 800 proceeds to 810 where access is denied; additionally, method 800 can terminate after 810. If, instead, the user session is authorized to access the CLI view, method 800 can proceed from 808 to 812, where the VRF can be referenced to obtain the reference to the CLI view. Additionally, at 814 the CLI view can then be applied to a user session, facilitating access to commands configured to the CLI view. As described, method 800 can provide a degree of security in connecting a user account and a CLI view, by authenticating the user account and only allowing access to the CLI view for a properly authenticated user account.

Figure 9:
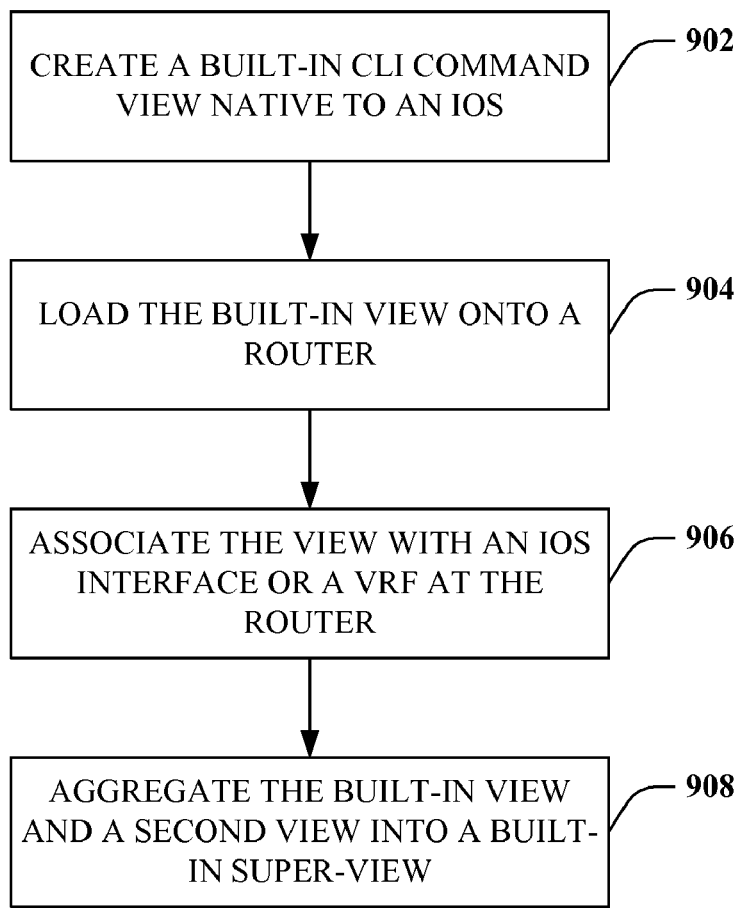
FIG. 9 illustrates an example methodology for utilizing built-in CLI views in an IOS platform.

Referring now to FIG. 9, a sample flowchart 900 is depicted for utilizing built-in CLI views in an IOS platform. According to particular aspects method 900, at 902, can create a built-in virtual CLI view native to an IOS platform. For instance, the built-in CLI view can be provided within an IOS platform loaded onto a routing device. In addition, the built-in CLI view can be correlated to one or more services or functionalities of the routing device. For instance, various services including security, network routing, voice transfer protocol, and the like, can incorporate IOS platform commands related to such services. A built-in CLI view related to a service, security for instance, can therefore have a suitable title, such as "SecOp" and be associated with all or a subset of all security related commands.

At 904, the built-in virtual CLI view can be loaded onto a routing device. At 906, an association between the built-in virtual CLI view and an IOS interface or VRF can be generated at the router. It should be appreciated that multiple IOS interfaces and/or VRFs can be associated in this manner to one or more virtual CLI views. Additionally, a user account can authenticate onto the virtual CLI view by way of an association with an IOS interface or VRF, etc. The association can be very efficient, because the virtual CLI view need not be generated by a network admin; it is already pre-loaded on the IOS platform. In accordance with particular aspects disclosed herein, a built-in view can be associated with an IOS or VRF instance, and modified with respect to the instance only. Consequently, the efficiency provided by built-in virtual CLI views can be implemented in conjunction with flexibility of an instance that can be modified to fit the needs of a particular interface or VRF (or, e.g., user account).

At 908, method 900 can aggregate the built-in virtual CLI view with at least one additional (e.g., a second) view (e.g., including a second built-in virtual CLI view, a custom generated virtual CLI view, an imported sharable CLI view, and so on) to form a built-in super-view (e.g., a virtual CLI super-view) that is native to an IOS platform or interface. Additionally, at least one command associated with the built-in virtual CLI view and/or the additional view can be incorporated into the built-in virtual CLI super-view. Furthermore, the at least one command can also be related to an IOS platform service or feature, as described herein. As described, method 900 can substantially reduce network device configuration time while allowing a high degree of CLI view flexibility for such devices.

Figure 10:
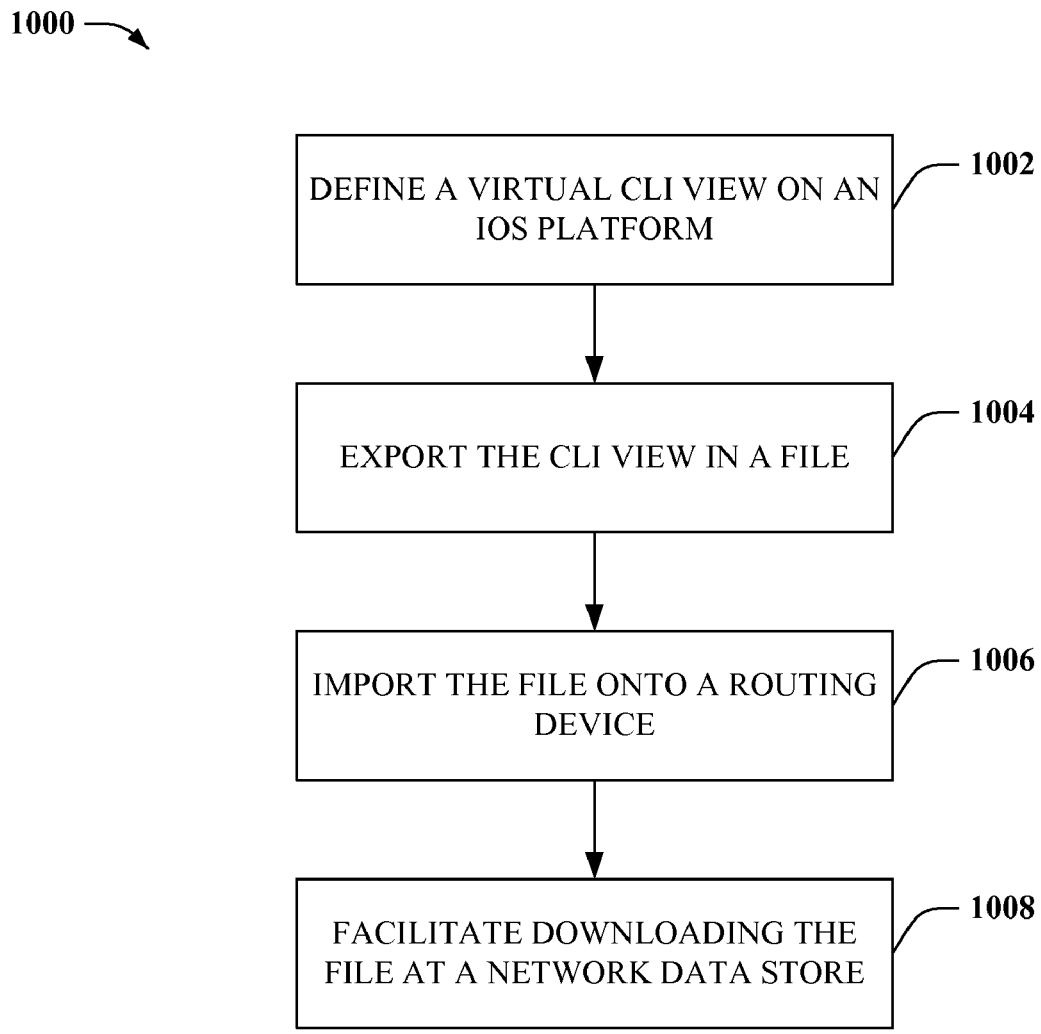
FIG. 10 depicts an example methodology for providing export, import, and download of sharable CLI views in accordance with one or more further aspects.

Referring now to FIG. 10, an example flowchart 1000 is depicted for providing export, import, and download of sharable CLI views in accordance with one or more further aspects. Method 1000, at 1002, can define a virtual CLI view on an IOS platform, as described herein. At 1004, the virtual CLI view can be exported in a file. For instance, a portable version of the virtual CLI view can be created by translating the virtual CLI view from a format utilized by the IOS platform into a portable file format (e.g., including a markup language format, such as HTML, XML, and the like, or other suitable network transferable file format known in the art). A portable file version of the virtual CLI view can then be written into the file and provided to other entities by way of remote communication. It should also be appreciated that an exported view can include complete IOS platform version/image information. Including such information can facilitate determining whether commands provided by the view are fully supported at an import device.

At 1006, the file (e.g., having a transferable version of the virtual CLI view contained within the portable file) can be imported onto a routing device (e.g., in a manner analogous to FPM.xml based protocol templates). Additionally, the routing device can have an instance, version, or the like, of the IOS platform, or a compatible operating system, loaded thereon. Furthermore, IOS version/image information contained within the file can be cross-referenced to determine whether all IOS platform commands provided by the virtual CLI view are supported at the routing device. If any command is not supported, the routing device can, for instance, output an error and terminate an import procedure and not load the file into memory. If the IOS commands are supported, the import procedure can continue and the file can be loaded onto the routing device. Once the file is loaded, the virtual CLI view can then be translated from the portable file format into a format understood by the IOS platform (or, e.g., a compatible operating system).

At 1008, method 1000 can facilitate downloading the file at a network data store. For instance, a portable file version of the virtual CLI view can be saved at the network data store. Additionally, the network data store can interface with one or more routing devices, computing devices, mobile devices, or the like, to facilitate transfer of a copy of the portable file version of the virtual CLI view to such devices. By providing the virtual CLI view or, for instance, a super-view as described herein, for download from a remote data store, device memory (e.g., dynamic random access memory (DRAM) and the like) can be preserved during a boot-up session of a routing device. For example, built-in CLI views or super-views could be provided for download at the remote data store (as described above) rather than stored in memory. A user could then selectively choose which built-in views/super-views are downloaded into memory. As a result, built-in views/super-views deemed irrelevant to a user would not be loaded onto a device, and the device would not have to load irrelevant information at boot-up. Method 1000, therefore, can provide for remote storage of portable CLI views or super-views to optimize efficiency and scalability of a communication network.

Figure 11:
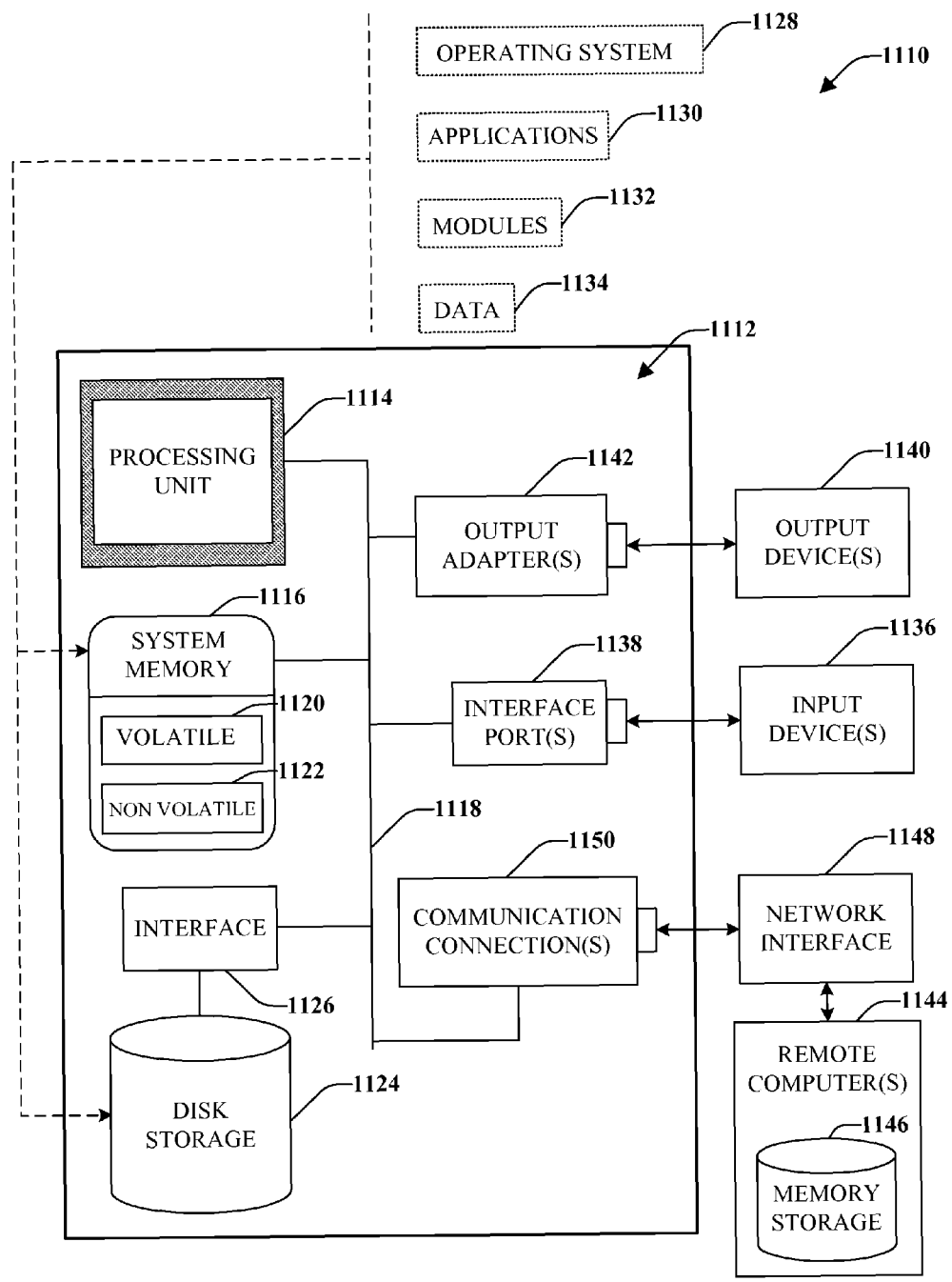
FIG. 11 illustrates a sample operating environment that can be utilized to implement various data processing, storage and transfer functions disclosed herein.

In order to provide additional context for various aspects of the disclosed subject matter, FIG. 11 as well as the following discussion is intended to provide a brief, general overview of a suitable environment in which the various aspects of the disclosed subject matter may be implemented. While the subject matter has been described above in the general context of computer-executable instructions of a computer program that runs on a computer and/or computers, those skilled in the art will recognize that the invention also may be implemented in combination with other program modules.

Generally, program modules include routines, programs, components, data structures, etc. that can perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices, described below.

With reference to FIG. 11, an example environment 1110 for implementing various aspects disclosed herein includes a computer 1112 (e.g., desktop, laptop, server, hand held, programmable consumer or industrial electronics . . . ). The computer 1112 includes a processing unit 1114, a system memory 1116, and a system bus 1118. The system bus 1118 can couple system components including, but not limited to, the system memory 1116 to the processing unit 1114. The processing unit 1114 can be any of various microprocessors, such as dual microprocessors, quad microprocessors, and other multiprocessor architectures suitable for a computer environment 1110.

The system bus 1118 can be any of several types of suitable bus structure(s) including the memory bus or memory controller, a peripheral bus or external bus, and/or a local bus using any suitable variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable ROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/non-removable, volatile/non-volatile computer storage media. FIG. 11 illustrates, for example, disk storage 1124. Disk storage 1124 includes, but is not limited to, devices such as a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in operating environment 1110. Such software can include an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the present invention can be implemented with various operating systems or combinations of operating systems.

A user can enter commands or information into the computer 1112 through input device(s) 1136. Input devices 1136 can include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 can utilize some of the same type of ports as input device(s) 1136. Thus, for example, a USB port may be used to provide input to computer 1112 and to output information from computer 1112 to an output device 1140. Output adapter 1142 is provided to illustrate that there are some output devices 1140 like displays (e.g., flat panel and CRT), speakers, and printers, among other output devices 1140 that require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and can typically include many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit-switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for example, internal and external technologies such as, modems including regular telephone grade modems, cable modems, power modems and DSL modems, ISDN adapters, and Ethernet cards or components.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim.

What is claimed is:

1. A system that provides a virtualized command line interface (CLI) view for an inter-networking operating system (IOS) independent of a virtual private network (VPN) routing/forwarding table (VRF) defined for the IOS, comprising:
    an IOS browser of a processor that integrates an IOS platform command into a virtualized IOS command view; and
    an IOS correlation component of the processor that associates the virtualized IOS command view within a definition of a VRF.

2. The system of claim 1, comprising:
    an authentication component that references a name of the VRF to identify the virtualized IOS command view defined therein; and
    an access component that applies the virtualized IOS command view to a user session that is authorized to access the virtualized IOS command view.

3. The system of claim 1, comprising a user customization platform that generates a CLI view instance on the IOS platform enabling the virtualized IOS command view to be modified with respect to the VRF or a user authorized for the VRF, or both.

4. The system of claim 3, comprising a user correlation component that enables a user to generate the CLI view instance local to a user account, rendering a modification of the virtualized IOS command view private to the user account.

5. The system of claim 1, comprising a command integration component that defines a native command view for an IOS platform.

6. The system of claim 5, the native command view has a pre-defined association with at least the IOS platform command.

7. The system of claim 5, comprising an aggregation component that defines a super-view associated with the native command view and at least a second native command view, the super-view incorporates at least one command associated with the native command view and at least one command associated with the second native command view.

8. The system of claim 7, at least one of the native command view, the super-view or the second native command view is a pre-defined native command view associated with an IOS platform service or feature.

9. The system of claim 8, the IOS platform service or feature includes a security feature, a routing feature, a wireless feature, a wide area network (WAN) optimization feature, a command management feature, an administrative control feature, a debug feature, a configuration feature, a show command feature, video transfer feature, voice transfer feature, or data transfer feature, or combination thereof.

10. The system of claim 1, comprising an export generation component that exports the virtualized IOS command view in the form of a digital file for integration into one or more IOS platform routers.

11. The system of claim 1, comprising a view import component that receives a digital file containing an exported version of the virtualized IOS command view and incorporates the command view into an IOS platform loaded on a network routing device.

12. The system of claim 1, comprising a network data server that provides access to an exported version of the virtualized IOS command view for download over a network.

13. A method for providing virtualized command line interface (CLI) views for an inter-networking operating system (IOS) routing system, comprising:

defining, with at least one processor, a virtual CLI view on an IOS platform;

loading a virtual private network routing/forwarding table (VRF) onto the IOS platform; and including a reference to the virtual CLI view within a definition of the VRF.

14. The method of claim 13, comprising:
configuring the VRF to an IOS platform interface;
authenticating a user session on the IOS platform interface;
verifying an association between the user session and the virtual CLI view;
referencing the definition of the virtual CLI view within the VRF; and
applying the virtual CLI view to the user session.

15. The method of claim 13, comprising aggregating the virtual CLI view and at least a second virtual CLI view into a CLI super-view, the CLI super-view incorporates at least one command associated with the virtual CLI view or second virtual CLI view that are correlated with an IOS platform service or feature.

16. The method of claim 13, comprising at least one of:
creating a built-in virtual CLI view native to the IOS platform;
loading the built-in virtual CLI view along with the IOS platform onto a router; and
associating the built-in virtual CLI view with an IOS platform interface or the VRF, or both, defined local to the router.

17. The method of claim 16, comprising aggregating the built-in virtual CLI view and a second built-in virtual CLI view into a built-in super-view that is native to the IOS platform.

18. The method of claim 13, comprising exporting a portable file version of the virtual CLI view for transfer to an instance of the IOS platform loaded on a routing device.

19. The method of claim 13, comprising importing a version of the virtual CLI view contained within a portable file onto an instance of the IOS platform loaded on a routing device.

20. The method of claim 13, comprising saving a portable file version of the virtual CLI view at a network data store for download by network components.

* * * * *